United States Patent [19]
Yap et al.

[11] Patent Number: 6,037,719
[45] Date of Patent: Mar. 14, 2000

[54] MATRIX-ADDRESSED DISPLAY HAVING MICROMACHINED ELECTROMECHANICAL SWITCHES

[75] Inventors: Daniel Yap, Thousand Oaks; Robert Y. Loo; Juan Lam, both of Agoura Hills, all of Calif.

[73] Assignee: Hughes Electronics Corporation, El Segundo, Calif.

[21] Appl. No.: 09/057,894

[22] Filed: Apr. 9, 1998

[51] Int. Cl.[7] ................................. G09G 3/10
[52] U.S. Cl. .................... 315/169.3; 315/169.1; 315/169.2; 359/230
[58] Field of Search ................ 315/161, 169.1, 315/169.2, 169.3; 362/800; 333/100, 101; 359/230; 216/41

[56] References Cited

U.S. PATENT DOCUMENTS

| | | | |
|---|---|---|---|
| 4,641,376 | 2/1987 | Rozenwaig et al. | 359/117 |
| 5,096,279 | 3/1992 | Hornbeck et al. | 359/230 |
| 5,121,089 | 6/1992 | Larson | 333/107 |
| 5,168,249 | 12/1992 | Larson | 333/81 A |
| 5,175,521 | 12/1992 | Larson | 333/235 |
| 5,596,194 | 1/1997 | Kubena et al. | 250/306 |
| 5,638,946 | 6/1997 | Zavracky | 200/181 |
| 5,665,253 | 9/1997 | Kubena et al. | 216/41 |
| 5,715,337 | 2/1998 | Spitzer et al. | 385/4 |
| 5,808,527 | 9/1998 | Santos | 333/205 |

*Primary Examiner*—Haissa Philogene
*Attorney, Agent, or Firm*—V. D. Duraiswamy; M. W. Sales

[57] ABSTRACT

A display includes a plurality of light-emitting devices arranged as a matrix of pixels and an addressing circuit coupled to each respective light-emitting device. The addressing circuit includes a plurality of micromachined electromechanical (MEM) switches operable to control the plurality of light-emitting devices. Each MEM switch includes a cantilever beam and a control electrode spaced therefrom to deflect the cantilever beam electrostatically in order to close or open the switch.

29 Claims, 4 Drawing Sheets

MATRIX-ADDRESSED DISPLAY HAVING MICROMACHINED ELECTROMECHANICAL SWITCHES

BACKGROUND OF THE INVENTION

1. Field of the Invention

The invention relates generally to matrix-addressed displays and, more particularly, to addressing circuits for control thereof.

2. Description of the Related Art

Displays are typically composed of a two-dimensional matrix of pixels, each of which may comprise a light-emitting device, such as a laser, a light-emitting diode (LED), or an organic light-emitting device (OLED), or a light-modulating device. Such displays generally include an addressing circuit for activating the matrix of pixels in either an active or a passive manner. In a typical passive addressing circuit, each pixel is located at the intersection of row and column data lines that determine which pixels in the matrix will be activated. A selected pixel is activated by passing current through the particular row and column lines that have been activated. Passive addressing techniques, however, require very high instantaneous currents to drive each light-emitting device because each pixel is activated only momentarily as the entire matrix is scanned and further because most light emission processes have a short lifetime relative to the scanning rates for the addressing lines.

Active matrix circuits, in contrast, have used transistors to control the current driving the light-emitting devices. In prior two-transistor designs, a gating transistor is controlled by two input data lines to set the state of a driving transistor, which controls the current supplied to the light-emitting device. The two input data lines for all of the pixels may be collectively arranged as two groups corresponding with the rows and columns of a two-dimensional matrix. One group of the input lines controls the light emission intensity of the pixel, while the other group provides the timing waveforms that control the application of the light emission intensity information to the pixel.

The state of the driving transistor is maintained by a storage capacitor coupled to the gate of the driving transistor. Unfortunately, a rather sizeable storage capacitor is required to compensate for the deleterious effect of the leakage current of the gating transistor. Further, the driving transistor has a substantial voltage drop (at least several volts) when in an "ON" state for supplying current to the light-emitting device. Still further, transistors may also be undesirable for their incompatibility with certain substrates, such as glass, which are favored for use with particular light-emitting devices (e.g., OLEDs).

SUMMARY OF THE INVENTION

In accordance with one aspect of the present invention, a display comprises a plurality of light-emitting elements and a circuit coupled to each respective light-emitting element. The circuit, in turn, comprises a plurality of switches operable to control the plurality of light-emitting elements. Each switch of the plurality of switches comprises a cantilever beam and a control electrode spaced therefrom.

In accordance with another aspect of the present invention, an electromechanical switch is useful in a circuit disposed on a substrate. The electromechanical switch comprises a control electrode secured to the substrate, a cantilever beam structure having a plurality of beams spaced from the substrate, and a plurality of conductors for connecting the electromechanical switch in the circuit. Each respective conductor is secured to the substrate and has a gap spaced from a corresponding beam of the plurality of beams.

In accordance with yet another aspect of the present invention, a circuit coupled to first and second input signal sources is useful for controlling a light-emitting element powered by a power supply. The circuit comprises a first switch having a first control electrode and a cantilever beam structure having a beam spaced from the first control electrode. A second switch has a second control electrode coupled to a second input signal source and a cantilever beam spaced from the second control electrode and having a conductive end portion. The circuit further comprises a first conductor coupled to the first input signal source and the first control electrode and having a gap spaced from the conductive end portion of the cantilever beam of the second switch. A second conductor is coupled to the power supply and the light-emitting device and has a gap spaced from the beam of the cantilever beam structure of the first switch.

DETAILED DESCRIPTION OF THE INVENTION

Figure 1:
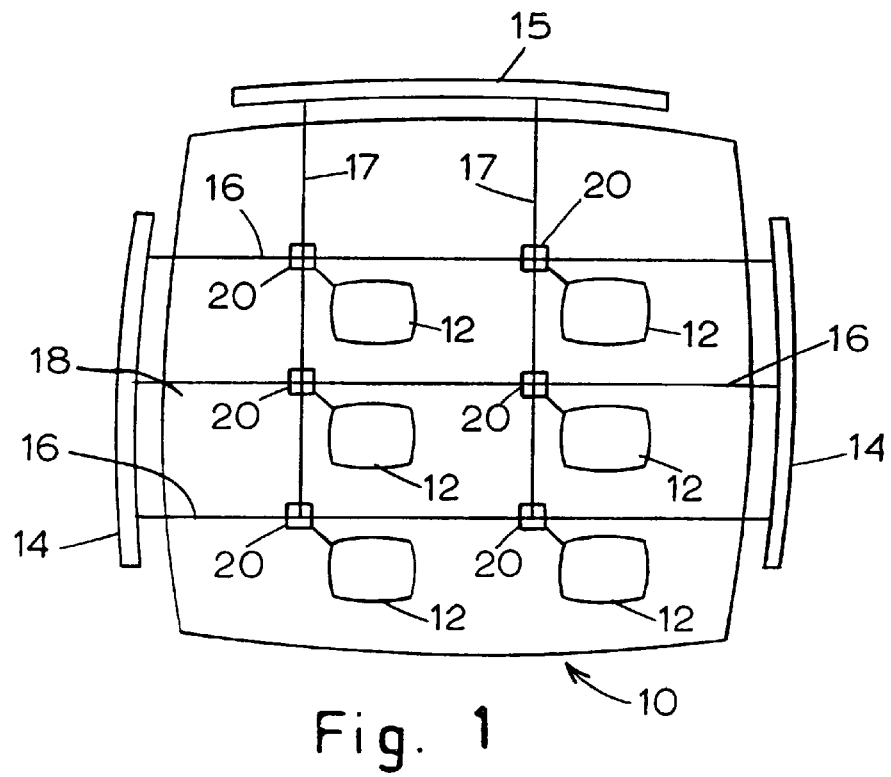
FIG. 1 is a schematic representation of a simplified matrix-addressed display capable of incorporating the present invention.

FIG. 1 is a schematic representation of a display 10 simplified for purposes of description. The simplified display 10 includes a 3×2 matrix of pixels, each of which comprises a corresponding light-emitting element 12. Each light-emitting element 12 is also shown schematically and may, in fact, comprise a light-emitting diode (LED), a laser, an organic light-emitting device (OLED), or any other light-emitting device known to those skilled in the art to be suitable for matrix-addressed displays. Alternatively, the light-emitting element 12 may comprise any of the light-modulating devices known to those skilled in the art.

The activation of each light-emitting element 12 is controlled by a control or addressing circuit schematically shown to include a pair of adjust controllers 14 and a timing controller 15. The adjust controllers 14 provide light emission intensity information to the pixel via interconnection lines 16. The timing controller 15, which preferably includes a clock, may provide timing information to the pixels via a series of clock pulses on interconnection lines 17.

The display 10 includes a panel or screen 18, upon which the light-emitting elements 12 are disposed. The panel or screen 18 may comprise glass, plastic silicon, or any other material known to those skilled in the art. When the light-emitting elements 12 are OLEDs, the panel of screen 18 preferably comprises glass or plastic. In that instance, part or all of an addressing circuit fabricated in accordance with the present invention may be disposed on the same transparent substrate (i.e., the panel of screen 18) on which the light-emitting elements 12 are disposed. As a result, problems associated with affixing the panel or screen 18 to a separate substrate are avoided.

It should be understood that the precise location of the addressing circuit components may be modified from that show in FIG. 1. For example, some or all of the addressing circuit components, such as the adjust controllers 14 and the timing controller 15, may be disposed on the display 18, Further, the addressing circuit may include only a single adjust controller 14. Still further, the actual physical arrangement and other characteristics of the interconnection lines 16 and 17 will depend on the location of the addressing circuit components, the particular type of light-emitting device utilized, the size and shape of the matrix, and other consideration known to those skilled in the art. In general, however, the addressing circuit may include components for generation input data signals that are representative of the amount of current, if any, to be supplied to particular light-emitting elements 12 from a power supply (not shown).

The addressing circuit further includes a plurality of matrix circuit elements 20, each of which is associated with a corresponding light-emitting element 12 and coupled to respective interconnection lines 16 and 17. Each matrix circuit element 20 includes components for processing the input data signals provided on the interconnection lines 16 and 17 to selectively couple respective light-emitting elements 12 to the power supply in accordance with the light emission intensity and timing information.

Figure 2:
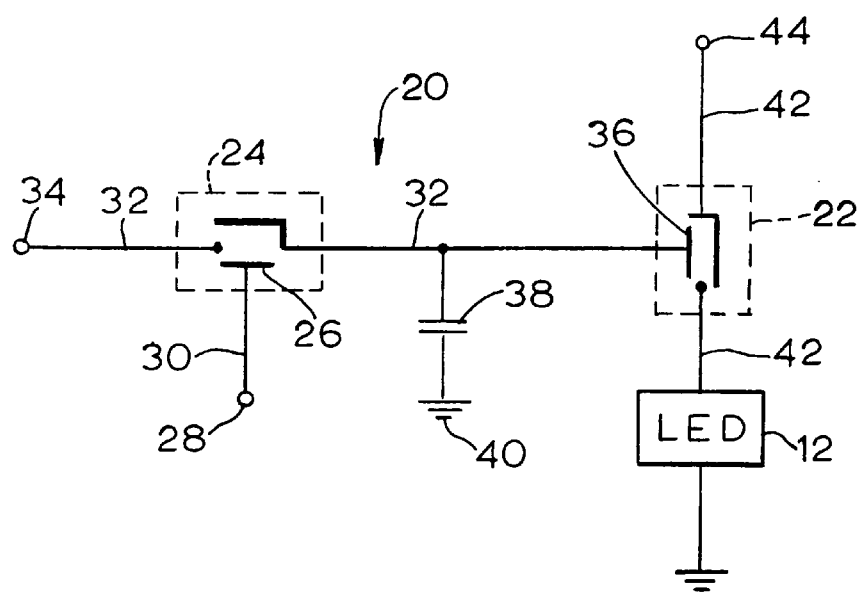
FIG. 2 is a schematic representation of a matrix circuit element of the matrix-addressed display of FIG. 1 in accordance with an embodiment of the present invention.

Referring now to FIG. 2, each matrix circuit element 20 includes a driving switch 22 and a gating switch 24. In accordance with the present invention, the driving switch 22 and the gating switch 24 each comprise a micromachined electromechanical (MEM) switch fabricated using conventional thin-film processing techniques. The gating switch 24 has a control or pull electrode 26 coupled to a timing signal source 28 by an interconnection line 30, which together may correspond with part or all of the timing controller 15 and one of the interconnection lines 17 of FIG. 1. The timing signal source 28 may provide a conventional series of clock pulses for determining the frequency and timing of pixel updates. For example, in an addressing circuit controlling a two-dimensional matrix of pixels, the timing signal source 28 may determine which column of pixels is to be scanned (i.e., the column of pixels to which input data will be applied).

The gating switch 24 is disposed in an interconnection line 32 for momentarily coupling an input signal source 34 to a control or pull electrode 36 of the driving switch 22. The interconnection line 32 and the input signal source 34 together may correspond with one of the interconnection lines 16 and part or all of one of the adjust controllers 14 of FIG. 1, respectively. A storage capacitor 38 maintains the input voltage to the pull electrode 36 until the next cycle when the gating switch 24 couples another input signal to the driving switch 22. One end of the storage capacitor 38 is coupled to a point between the gating switch 24 and the pull electrode 36, while the other end is coupled to a ground terminal 40. The driving switch 22 is disposed in an interconnection line 42 coupling the light-emitting element 12 to a power supply 44.

In operation, the matrix circuit element 20 is responsive to the voltage magnitude of an input signal provided by the input signal source 34 for changing the luminescent state of the light-emitting element 12 (ie., whether the light-emitting element 12 is fully activated, partially activated, or deactivated). However, the matrix circuit element 20 will only read the input signal when the voltage of the timing signal supplied by the timing signal source 28 has a sufficiently high magnitude to close the gating switch 24.

The gating switch 24 and the driving switch 22 are switched electrostatically such that either positive or negative voltages may be used to close the switch. However, for simplicity in description, a positive nomenclature will be adopted such that a positive voltage "V+" applied to the control electrode will close a switch, and a negative voltage "V−" will open a switch. It shall be understood that the voltage magnitudes V+ and V− may, in fact, correspond with any DC voltage level relative to a particular reference voltage.

Provided that the gating switch 24 has been closed by a timing signal pulse having a voltage magnitude equal to or exceeding V+, the storage capacitor 38 charges (or discharges) as necessary in accordance with the input signal. Consequently, the voltage applied to the control electrode 36 of the driving switch 22 will eventually approximate the input signal voltage, the only difference being attributable to a small resistance associated with the gating switch 24. The voltage drop across a MEM switch, however, is insignificant compared to the voltage drop across a transistor in its "ON" state.

In the event that the voltage applied to the control electrode 36 reaches V+, the driving switch 22 will close to couple the light-emitting element 12 to the power supply 44 via the interconnection line 42, thereby activating the light-emitting element 12. The light-emitting element 12 will remain activated at least until the next pulse from the timing signal source 28 activates the gating switch 24. At that time, the state of the driving switch 22 will only be modified if the input signal voltage is not V+. A negative voltage (V−) may be desirable, however, to discharge the storage capacitor 38 quickly and deactivate the light-emitting element 12 in a prompt manner. Of course, if the input signal is still at V+, the storage capacitor 38 will remain charged, thereby maintaining the activated state of the driving switch 22 through another cycle.

Unlike the transistors utilized in prior addressing circuits, the gating switch 24 has no leakage current to drain the storage capacitor 38 between clock pulses from the timing signal source 28. As a result, the storage capacitor 38 need not be nearly as large as those capacitors required in transistor-based addressing circuits. In fact, the inherent capacitance of the control electrode 36 may be sufficient to provide the requisite memory, in which case the storage capacitor 38 is merely representative of the inherent capacitance of the control electrode 36.

It shall be understood that the addressing circuit may include a separate input signal source 34 for each row of the matrix. Each of these input signal sources 34 modifies the input signal voltage as the timing signal source scans the matrix of light-emitting elements 12 column-by-column. The present invention, however, may be utilized in connection with other procedures known to those skilled in the art for controlling the matrix of light-emitting elements 12 through the use of input and timing (or other) signals.

Figure 3A:
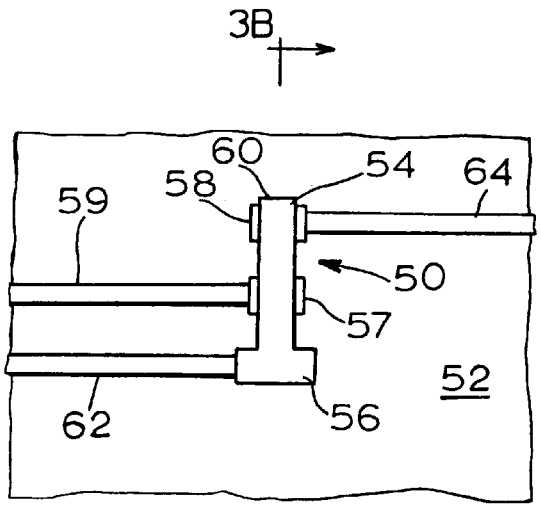
FIG. 3A is a plan view of an electromechanical switch for use in the matrix circuit element of FIG. 2 in accordance with one embodiment of the present invention.
Figure 3B:
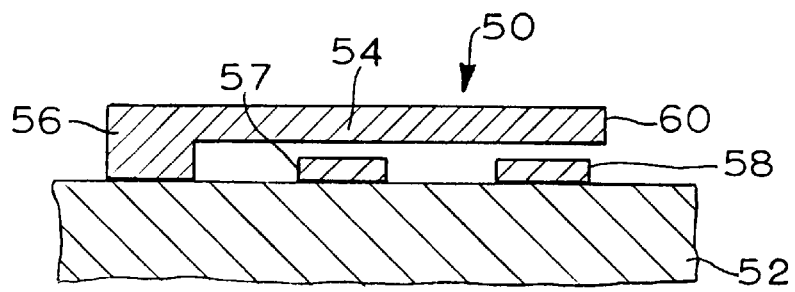
FIG. 3B is a cross-sectional view of the electromechanical switch of FIG. 3A taken along lines 3B—3B.

Referring now to FIGS. 3A and 3B, a MEM switch 50 is useful in an addressing circuit (or matrix circuit element 20 thereof) in accordance with one embodiment of the present invention. The MEM switch 50 is secured, together with the other components of the matrix circuit element 20, to a substrate 52, which may comprise any typical semiconductor material, such as Si, GaAs, or any other known to those skilled in the art to be suitable for micromachines. However, for displays utilizing OLEDs, the substrate 52 preferably comprises glass or plastic and, as a result, the light-emitting elements 12 and components of the matrix circuit element 20 are advantageously disposed on the same substrate. It shall be understood that the MEM switch 50 may be secured to the substrate 52 either directly or indirectly by way of an intervening layer (not shown). Such intervening layers are known to those skilled in the art and may improve adhesion, electrical isolation, and/or other characteristics of the MEM switch 50.

The MEM switch 50 includes a cantilever beam structure having a cantilever beam 54 secured to the substrate 52 at a fixed end 56. As shown in FIG. 3A, the fixed end 56 may have a greater width than the cantilever beam 54 to better secure the MEM switch 50 to the substrate 52; however, this need not be so. The cantilever beam 54 is spaced from the substrate 52 and a control or pull electrode 57, as shown in FIG. 3B. The cantilever beam 54 may be made of several different materials (or combinations thereof), as will be discussed herein below, provided, of course, that the materials are sufficiently flexible.

The potential difference between the cantilever beam 54 and the pull electrode 57 will determine the amount of spacing between the cantilever beam 54 and the substrate 52. The pull electrode 57 may take on a variety of shapes, so long as the electrostatic forces between the pull electrode 57 and the cantilever beam 54 are sufficiently strong to pull the cantilever beam 54 down to contact an electrode 58. Similarly, the cantilever beam may be shaped differently than that shown in FIGS. 3A and 3B. For example, some shapes may include a beam with a non-uniform width to improve flexibility and/or the manner in which the beam deflects toward the substrate 52.

The voltage applied to the pull electrode 57 is supplied by an interconnection line 59 secured to the substrate 52, which may correspond with the interconnection line 30 of FIG. 2. The interconnection line 59 (and any other such lines discussed herein) may, in general, comprise any conductor or conductive element utilized for carrying current from one circuit location to another. Further, the conductor or conductive element may comprise any material known to those skilled in the art to be suitable for micromachines and/or thin film devices.

In the embodiment shown in FIGS. 3A and 3B, the cantilever beam 54 includes a conductive portion extending from the fixed end 56 to an end portion 60 of the cantilever beam 54. This conductive portion of the cantilever beam 54 and the electrode 58 together form part of a line or conductive path having a disconnect or gap to be closed (or opened) by operation of the MEM switch 50. More particularly, the end portion 60 of the cantilever beam 54 is spaced from, or suspended above, the electrode 58 for contact therewith. Once the end portion 60 contacts the electrode 58, the MEM switch 50 has closed the disconnect and a conductive path has been established. In addition to the components of the MEM switch 50, this conductive path includes an interconnection line 62 disposed on the substrate 52 and connected to the fixed end 56, which, if the switch 50 is closed, is electrically coupled to an interconnection line 64 disposed on the substrate 52 and connected to the electrode 58. All of the aforementioned portions of the conductive path (including the conductive portions of the MEM switch 50) may correspond with the interconnection lines 32 and 42 and the switches 22 and 24 of FIG. 2, respectively.

The conductive portion of the cantilever beam 54 may encompass the entire cantilever beam, in which case the cantilever beam 54 is fabricated with a metal or other conductive material known to those skilled in the art to be suitable for thin-film deposition techniques. The material must also be flexible enough so that excessive electrostatic forces (and, therefore, higher addressing circuit voltages) between the pull electrode 57 and the cantilever beam 54 are not necessary. Suitable materials include Al, Ni, Au, and polysilicon. Alternatively, the cantilever beam 54 may comprise a dielectric portion (not shown) together with the conductive portion. The conductive portion of the cantilever beam 54 could then, for instance, comprise an interconnection line disposed on the cantilever beam 54 extending from the fixed end 56 to a conductive tip.

Figure 4A:
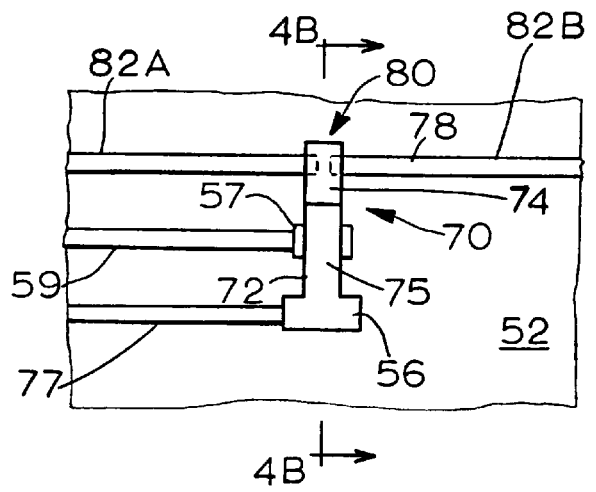
FIG. 4A is a plan view of an electromechanical switch for use in the matrix circuit element of FIG. 2 in accordance with another embodiment of the present invention.
Figure 4B:
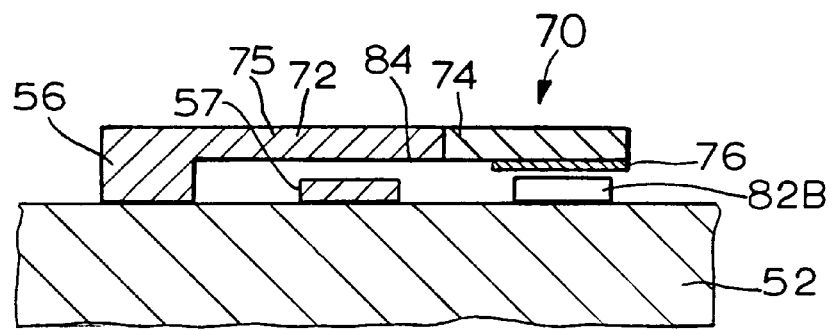
FIG. 4B is a cross-sectional view of the electromechanical switch of FIG. 4A taken along lines 4B—4B.

Referring now to FIGS. 4A and 4B, an alternative MEM switch 70 for use in the addressing circuit 20 includes a cantilever beam structure having a cantilever beam 72 with a dielectric portion 74, a conductive portion 75, and a conductive end portion 76 (FIG. 4B). Elements shown in prior figures will be identified with like reference numerals. Unlike the foregoing embodiment of the addressing circuit 20, the MEM switch 70 is said to be "floating" because the conductive end portion 76 of the cantilever beam 72 is electrically insulated from a voltage applied to the conductive portion 75. The voltage of the conductive portion 75 is preferably established via an interconnection line 77, but alternatively may be established via ion or electron bombardment or other methods of applying charge known to those skilled in the art.

The dielectric portion 74, the conductive portion 75, and the conductive end portion 76 may take on shapes other than that shown in FIGS. 4A and 4B. For example, the cantilever beam 72 may include a sandwich arrangement (with an upper conductive portion and a lower dielectric portion) and others known to those skilled in the art (so long as the conductive end portion 76 is electrically insulated from the conductive portion 75).

In operation, an appropriate potential difference between the pull electrode 57 and the conductive portion 75 of the cantilever beam 72 will create an electrostatic force deflecting the antilever beam 72 to draw the conductive end portion 76 toward an interconnection line 78. The interconnection line 78 has a gap 80 (i.e., a break or disconnect, shown in phantom in FIG. 4A) spaced from and directly beneath the conductive end portion 76 of the cantilever beam 72. When the conductive end portion 76 is fully lowered, the gap 80 is bridged to connect portions 82A and 82B of the interconnection line 78, and the MEM switch 70 is closed.

The dielectric portion 74 of the cantilever beam 72 serves to separate the conductive portion 75 from the conductive end portion 76. Dielectric materials suitable for the dielectric portion 74 (or any other dielectric portion referenced in connection with a different embodiment) include silicon dioxide and silicon nitride. Other dielectrics known to those skilled in the art may, of course, also be used. Factors to be considered in selecting a dielectric material suitable for the cantilever beam include mechanical strength, flexibility, and electrical insulation properties.

As shown in FIG. 4B, the conductive end portion 76 may comprise a pad disposed on an underside 84 of the cantilever beam 72. Alternatively, the conductive end portion 76 comprises an integral part of the cantilever beam 72 and, therefore, may include the entire end of the cantilever beam 72 or some fraction thereof, such as a lower tip. In general, the conductive end portion 76 may comprise any portion of the cantilever beam 72 and is not limited to any particular size or shape, so long as the gap 80 can be bridged when the cantilever beam 72 is deflected toward the substrate 52.

The floating MEM switch 70 of FIGS. 4A and 4B is desirable for use in the matrix circuit element 20 because the circuit components controlling the switch are separated from the interconnection line to be switched (e.g., the interconnection lines 32 and 42). As a result, it shall be understood that an addressing circuit utilizing floating MEM switches requires lower switching voltages. For example, if the light-emitting element 12 needs a five volt source and the matrix circuit element 20 has two non-floating MEM switches (see, e.g., FIGS. 3A and 3B) that require a five-volt differential for closure, a ten-volt power supply would be required for the input signal source 34. Further, closure of the gating switch 24 would require a fifteen-volt pulse from the timing signal source 28.

In contrast, if the driving switch 22 is a floating MEM switch, only a five-volt power supply would be required for the input signal source 34. However, the timing signal source 28 would still have to provide ten-volt pulses unless the gating switch 24 was also floating.

Figure 5:
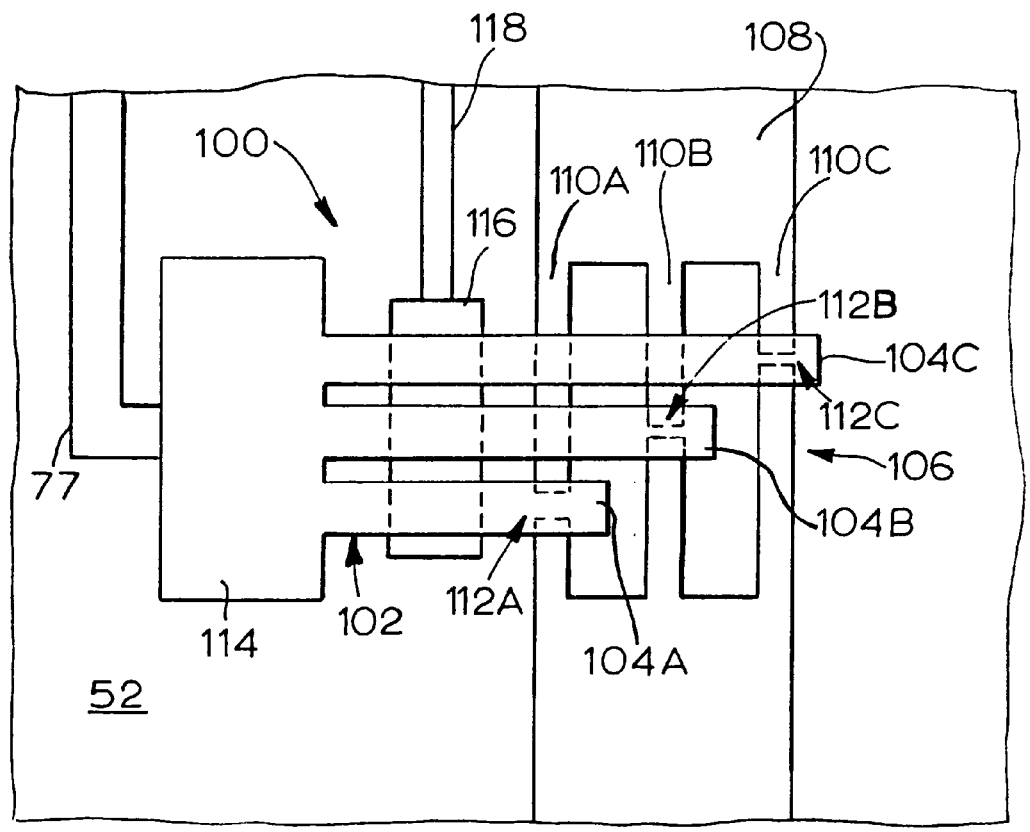
FIGS. 5–7 are plan views of electromechanical switches for use in the matrix circuit element of FIG. 2 in accordance with yet further embodiments of the present invention.

Referring now to FIG. 5, yet another embodiment of an addressing circuit according to the present invention includes a variable resistance MEM switch 100 for use as the driving switch 22 (FIG. 2). The MEM switch 100 includes a cantilever beam structure 102 having a plurality of beams 104. Taken alone, each beam of the plurality of beams 104 may be similar in construction to the single cantilever beam structure described in connection with FIGS. 4A and 4B. For example, the cantilever beam structure 102 may include three beams 104A–C spaced from a segment 106 of a conductor 108 secured to the substrate 52. The conductor segment 106, in turn, includes a plurality of conductor branches 110. The number of conductor branches 110 may, but need not, correspond with the number of beams 104. In the embodiment shown in FIG. 5, the segment 106 includes three conductor branches 110A–C, each of which has a corresponding gap 112A–C spaced from and directly beneath a respective beam 104A–C.

The beams 104A–C have varying lengths as shown in FIG. 5 to accommodate the different distances of the gaps 112A–C from a common end 114 of the cantilever beam structure 102. The common end 114, as in the aforementioned embodiments, secures the cantilever beam structure 102 to the substrate 52. The common end 114 is coupled to the interconnection line 77 to establish a potential difference between respective conductive portions (see, e.g., element 75 of FIGS. 4A and 4B) of each of the beams 104 and a control or pull electrode 116. In an alternative embodiment (not shown), the cantilever beam structure 102 comprises separate fixed ends for each beam 104. The cantilever beam structure 102 may comprise an integrally formed, unitary body (of conductive and dielectric portions as described in connection with the floating MEM switch 70) or, alternatively, comprise an assembly of component parts.

In operation, a voltage is applied to the pull electrode 116 via an interconnection line 118. The same electrostatic force is then applied to each beam 104, resulting in approximately the same degree of deflection for each beam 104. As will be understood, the gap 1 1 2C may be bridged first (ie., with the least amount of deflection), followed by the gap 112B and the gap 112A. The particular lengths of the beams 104 and the strength of any other forces acting thereon (e.g., gravity) will determine whether the conductive portion of a particular beam will bridge its respective gap. In general, however, the voltage on the pull electrode 116 is representative of the light emission intensity intended for the light-emitting element 12 and determinative of whether one, two, or all three of the conductor branches 110 will be conducting current to the light-emitting element 112, thereby effectively creating a variable resistor in the conductor segment 106.

The variable luminescence provided by such a variable resistance is desirable for display applications requiring gray-scale emissions. Varying the length of the gaps 112 can provide the flexibility necessary for setting the luminescence levels appropriately. For example, as shown in FIG. 5, the gap 112A is longer than the gaps 112B and 112C. As shall be understood, the amount of luminescent variance resulting from differing gap lengths will depend upon the resistivity of the conductive portion of each beam 104 relative to the resistivity of the material used to form the conductor branches 110.

It should further be understood that, in the embodiment shown in FIG. 5, the use of the common end 114 mandates that the MEM switch 100 be a floating switch and, therefore, include an isolated conductive end portion as described hereinabove. However, in an embodiment wherein each beam 104 is separately secured to the substrate 52, the switches may either be floating or non-floating.

Figure 6:
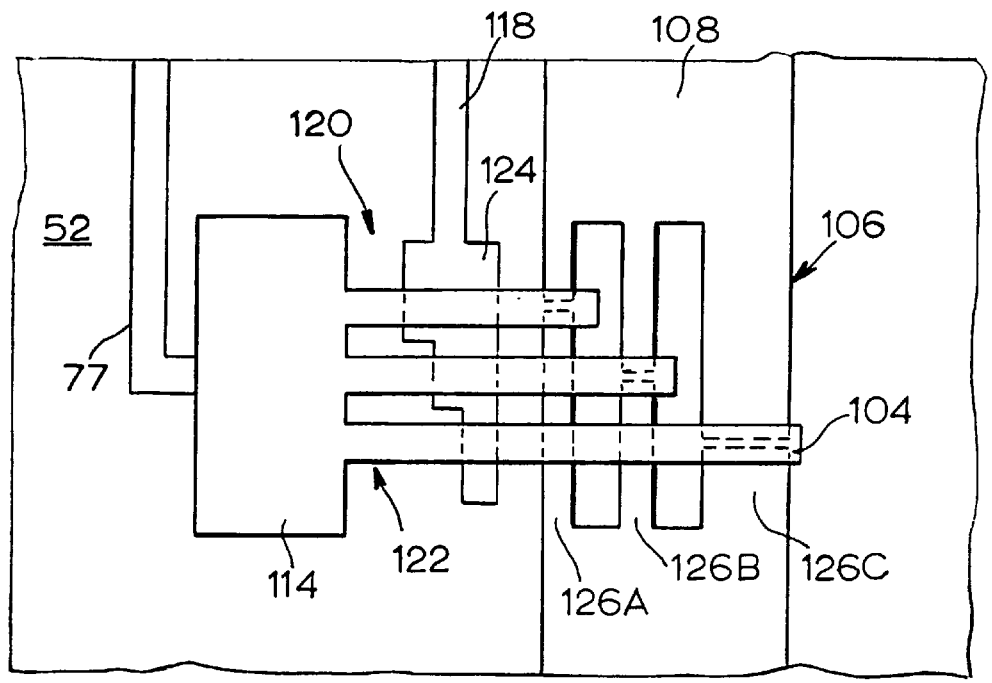

FIG. 6 shows another embodiment of a variable resistance MEM switch 120 for use in an addressing circuit according to the present invention. The MEM switch 120 has a cantilever beam structure 122 similar to the multiple beam structure 102 of FIG. 5. In contrast to the embodiment of FIG. 5, however, the MEM switch 120 includes a control or pull electrode 124 having a non-uniform shape with respect to the beams 104. The pull electrode 124 may be considered to comprise a plurality of portions of non-equal surface area, each of which is associated with (i.e., spaced from and directly beneath) one or more of the plurality of beams 104. For example, the pull electrode 124 may have a "staircase" shape as shown in FIG. 6, or, alternatively, a wedge or triangular shape. Such non-rectangular shapes provide the pull electrode 124 with three differently-sized portions spaced from each of three beams 104, respectively.

As will be understood, the strength of the electrostatic forces established by a given voltage on the pull electrode 124 will vary for each beam 104 in accordance with the surface area of the portion of the pull electrode 124 spaced from the particular beam 104. Thus, any shape that provides distinguishable amounts of electrostatic force to the respective beams 104 may be utilized. Such variability in electrostatic attraction, in turn, provides for further design control over the variable resistance of the conductor segment 106.

With continued reference to the embodiment of FIG. 6, still further design control over the variable resistance may be provided by providing conductor branches 126 of varying widths. As shown, the branch 126C is wider than the branches 126A and 126B. With other design parameters held constant, shorter gaps and/or wider conductor branches will generally result in a lower resistance. In one particular embodiment, the above-described design parameters may be utilized to fabricate a conductor segment wherein the resistances of the conductor branches are related in a binary progression such that n branches yield $2^n$ possible resistances. It shall be understood that such an embodiment may require each conductor branch to have multiple gaps and, therefore, multiple beams controlling each branch of the segment.

Figure 7:
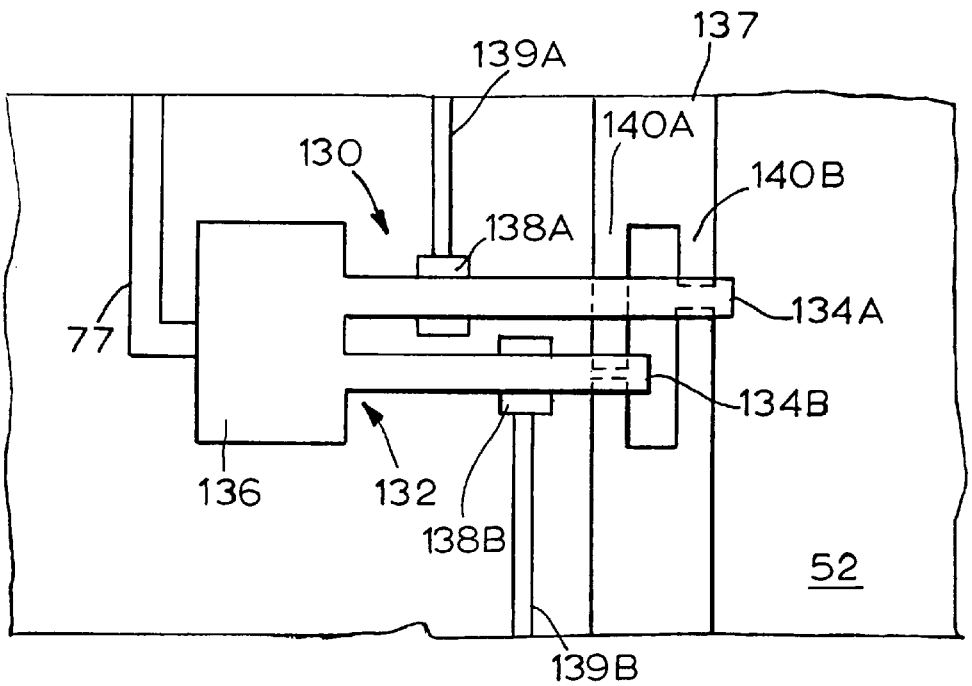

Referring now to FIG. 7, yet another embodiment of a variable resistance MEM switch 130 includes a cantilever beam structure 132 having a plurality of beams 134 secured to the substrate 52 by a common end 136 (or, alternatively, a plurality of fixed ends). For yet further flexibility in controlling the resistance of a conductor segment 137, each beam 134 is separately controlled via a plurality of control or pull electrodes 138 secured to the substrate 52. Such multiple pull electrodes 138 may, of course, be utilized in connection with any or all of the design choices described hereinabove in connection with the variable resistance MEM switch embodiments of FIGS. 5 and 6. In the embodiment of FIG. 7, pull electrodes 138A–B have separate voltages supplied by conductive lines 139A and 139B, respectively. It shall be understood that the number of pull electrodes 138 need not exactly correspond with the number of beams 134. The MEM switch 130 may also be utilized with a plurality of conductors rather than simply with the single conductor segment 1 37 and its conductor branches 140A–B.

The MEM switch 130 may be used in applications requiring multiple control signals. For example, in digital-to-analog conversion, the lines 139A and 139B may carry a digital code that is representative and determinative of the analog current passing through the conductor branches 140A and 140B (and, ultimately, the conductor segment 137). Such a digitally controlled switch permits use of an addressing circuit with digital input data, such as that provided by a digital signal processor bus. As a result, no separate digital-to-analog converter is required in the adjust controllers 14 to determine the gray-scale current levels. It shall be understood that this particular embodiment of the present invention would require multiple input data lines extending from the adjust controllers 14 to each of the matrix circuit elements 20. Lastly, in connection with such a digital-to-analog embodiment, the lengths of the gaps 134 and the widths of the conductor branches 140 may be set such that the same voltage applied to the control electrodes 138 would accurately accept binary-coded input data. To this end, for example, the gap in the conductor branch 140A may be approximately twice as long as the gap in the conductor branch 140B.

The addressing circuits and MEM switches of the present invention may be fabricated using conventional surface or bulk micromachine technology. For example, fabrication of an embodiment comprising OLEDs begins with forming the addressing circuit components (e.g., the MEM switches, storage capacitors, and interconnection lines) on a glass substrate using standard processing steps such as photolithography, metal and dielectric deposition, plating, and etching. Next, the anodes of the OLEDs, which typically comprise indium-tin oxide, are also deposited on the glass substrate. The addressing circuit region is then shielded by a stencil mask, and the layers of organic material and cathode metals are deposited. Lastly, the entire display is sealed in an inert atmosphere in accordance with practices known to those skilled in the art.

Numerous other modifications and alternative embodiments of the invention will be apparent to those skilled in the art in view of the foregoing description. Accordingly, this description is to be construed as illustrative only. The details of the structure and method may be varied substantially without departing from the spirit of the invention, and the exclusive use of all modifications which are within the scope of the appending claims is reserved.

What is claimed is:

1. A display, comprising:
   a plurality of light-emitting elements; and
   a circuit coupled to each respective light-emitting element and comprising a plurality of switches operable to control the plurality of light-emitting elements;
   wherein each switch of the plurality of switches comprises a cantilever beam and a control electrode spaced therefrom; the plurality of switches including a first switch and a second switch;
   the first switch being operable to couple at least one of the plurality of light-emitting elements to a power supply; and
   the second switch being operable to couple the control electrode of the first switch to an input signal representative of light emission data for at least one of the plurality of light-emitting elements.

2. The display of claim 1, wherein:
   the plurality of switches includes a first switch and a second switch wherein the cantiever beam of the first switch includes a conductive portion;
   the conductive portion of the cantilever beam of the first switch is coupled to one of a power supply and the light emittng element when the first switch is in a first state; and
   the conductive portion of the cantilever beam of the first switch being coupled to both the power supply and the light-emitting element when the first switch is in a second state.

3. The display of claim 1, wherein the cantilever beam of at least one of the plurality of switches includes a conductive portion at a floating potential.

4. The display of claim 1, wherein:
   the respective cantilever beams of the first and second switches have a conductive end portion; and
   the circuit further comprises:
     a first line coupled to a power supply and one of the plurality of light-emitting devices and having a gap spaced from the conductive end portion of the first switch; and
     a second line coupled to an input signal source and the control electrode of the first switch and having a gap spaced from the conductive end portion of the second switch.

5. The display of claim 1, wherein the plurality of switches includes a floating switch operable to couple the light-emitting element to a power supply.

6. The display of claim 5, wherein the floating switch includes a further control electrode and a further cantilever beam spaced from the further control electrode.

7. The display of claim 5, wherein the floating switch includes a further cantilever beam spaced from the control electrode.

8. The display of claim 7, wherein the circuit further comprises a line having a first branch and a second branch, the first and second branches each having a gap spaced from the first-named cantilever beam and the further cantilever beam, respectively.

9. The display of claim 8, wherein the first branch and the second branch have different widths.

10. The display of claim 8, wherein the gaps of the first and second branches have different lengths.

11. The display of claim 7, wherein:
   the control electrode includes a first portion spaced from the first-named cantilever beam and a second portion spaced from the further cantilever beam; and
   the second portion has a greater surface area than the first portion.

12. The display of claim 1, wherein the plurality of switches and the plurality of light-emitting elements are secured to a substrate which comprises a material selected from the group consisting of glass and plastic.

13. An electromechanical switch for use in a circuit disposed on a substrate, comprising:
   a control electrode secured to the substrate;
   a cantilever beam structure having a plurality of beams spaced from the substrate; and
   a plurality of conductors for connecting the electromechanical switch in the circuit wherein each respective conductor comprises a disconnect associated with a corresponding beam of the plurality of beams;
   wherein at least one beam of the plurality of beams is spaced from the control electrode.

14. The electromechanical switch of claim 13, further comprising a further control electrode secured to the substrate and wherein:
   the plurality of beams includes a first beam and a second beam; and
   the first beam and the second beam are spaced from the first-named control electrode and the further control electrode, respectively.

15. The electromechanical switch of claim 13, wherein the plurality of conductors are coupled together to compose a single line.

16. The electromechanical switch of claim 15, wherein:
   the plurality of beams includes a first beam and a second beam;
   the control electrode includes a first portion spaced from the first beam and a second portion spaced from the second beam; and
   the second portion has a greater surface area than the first portion.

17. The electromechanical switch of claim 13, wherein the plurality of conductors includes a first conductor and a second conductor having different widths.

18. The electromechanical switch of claim 13, wherein each disconnect comprises a gap spaced from the corresponding beam.

19. The electromechanical switch of claim 18, wherein:
   the plurality of conductors includes a first conductor and a second conductor; and
   the respective gaps of the first and second conductors have different lengths.

20. The electromechanical switch of claim 18, wherein:
   the cantilever beam structure includes a common end secured to the substrate;
   each beam is coupled to the common end; and
   each beam includes a conductive end portion spaced from the gap of the respective conductor and a non-conductive portion between the common end of the cantilever beam structure and the conductive end portion.

21. The electromechanical switch of claim 13, wherein the substrate comprises a material selected from the group consisting of glass and plastic.

22. The electromechanical switch of claim 13 in combination with a light-emitting element and a power supply wherein the electromechanical switch is operable to couple the light-emitting element to the power supply.

23. A circuit coupled to a first input signal source and a second input signal source for controlling a light-emitting element powered by a power supply, comprising:
   a first switch having a first control electrode and a cantilever beam structure having a beam spaced from the first control electrode;
   a second switch having a second control electrode coupled to the second input signal source and a cantilever beam spaced from the second control electrode wherein the cantilever beam has a conductive end portion;
   a first conductor coupled to the first input signal source and the first control electrode and having a gap spaced from the conductive end portion of the cantilever beam of the second switch; and
   a second conductor coupled to the power supply and the light-emitting element and having a gap spaced from the beam of the cantilever beam structure of the first switch.

24. The circuit of claim 23, wherein the light-emitting element and the circuit are secured to a substrate comprising a material selected from the group consisting of glass and plastic.

25. The circuit of claim 23, wherein:
   the second input signal source comprises a clock; and
   the conductive end portion of the second switch bridges the gap in the first conductor when the second input signal source supplies a clock pulse to the second control electrode of the second switch.

26. The circuit of claim 25, wherein:
   the cantilever beam structure of the first switch includes a further beam; and
   the second conductor includes a segment comprising a first branch and a second branch wherein each branch includes a gap spaced from the first-named beam and the further beam of the cantilever beam structure, respectively.

27. The circuit of claim 26, wherein:
   the first-named and further beams include a respective conductive end portion; and
   a voltage magnitude of the first input signal source is representative of the light emission intensity intended for the light-emitting element and determinative of which of the conductive end portions of the first-named and further beams will bridge the respective gaps in each of the first and second branches of the second conductor provided that the clock pulse is supplied to the second control electrode.

28. The circuit of claim 26, wherein:
   the cantilever beam structure of the first switch includes a common end secured to a substrate; and
   the first-named and further beams are coupled to the common end.

29. The circuit of claim 23, wherein:
   the cantilever beam structure of the first switch includes a plurality of beams;
   the first control electrode is one of a plurality of control electrodes of the first switch, each of which is spaced from a corresponding beam of the plurality of beams;
   the first conductor is one of a plurality of lines coupling the first input signal source to the plurality of control electrodes for the first switch, respectively; and
   the first input signal source supplies a digital code to the plurality of control electrodes via the plurality of lines, the digital code being representative of the light emission intensity intended for the light-emitting element.

* * * * *